(12) United States Patent
Yang

(10) Patent No.: US 7,088,723 B2
(45) Date of Patent: Aug. 8, 2006

(54) SYSTEM AND METHOD FOR ENHANCING A VOICE CHANNEL IN VOICE OVER INTERNET PROTOCOL

(75) Inventor: Jin Young Yang, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 775 days.

(21) Appl. No.: 09/790,654

(22) Filed: Feb. 23, 2001

(65) Prior Publication Data

US 2004/0213204 A1    Oct. 28, 2004

(51) Int. Cl.
*H04L 12/56* (2006.01)

(52) U.S. Cl. .................. 370/395.52; 370/401; 370/466

(58) Field of Classification Search ................ 370/389, 370/395.1, 395.5, 395.52, 395.6, 395.64, 370/400, 401, 465, 466, 467, 474
See application file for complete search history.

(56) References Cited

U.S. PATENT DOCUMENTS

| | | | |
|---|---|---|---|
| 6,438,123 B1 * | 8/2002 | Chapman ..................... | 370/351 |
| 6,728,261 B1 * | 4/2004 | Sasson et al. ............... | 370/466 |
| 6,865,150 B1 * | 3/2005 | Perkins et al. .............. | 370/230 |
| 2002/0080955 A1 * | 6/2002 | Hou et al. ................... | 379/395 |
| 2002/0126677 A1 * | 9/2002 | Hathaway et al. ..... | 370/395.64 |
| 2004/0037317 A1 * | 2/2004 | Zalilzky et al. ............. | 370/466 |

FOREIGN PATENT DOCUMENTS

| | | | |
|---|---|---|---|
| JP | 11-331274 A | | 11/1999 |
| WO | WO 2002/35863 A2 | | 5/2002 |

* cited by examiner

*Primary Examiner*—Derrick Ferris
(74) *Attorney, Agent, or Firm*—Sughrue Mion, PLLC

(57) ABSTRACT

A method and system for enhancing a voice channel in voice over Internet protocol includes an integrated access device (IAD) that receives voice data from user devices, removes RTP/UDP header and IP header information, and generates an AAL2 CPS cell. A Registration, Administration and Status (RAS) server receives the AAL2 CPS cell, removes the AAL2 information and adds an RTP/UDP header and IP header, such that an IP packet is output for Internet transport. The RAS server can also receive an IP packet and convert the IP packet to an AAL2 CPS cell, to be transported to the IAD. The RAS performs the conversion in accordance with header data received from the IAD that is stored in, and removed from, a lookup table in response to command signals sent by the IAD. Thus, the asymmetric digital subscriber line (ADSL) handles an increased number of calls, and at an increased efficiency.

48 Claims, 16 Drawing Sheets

| | | |
|---|---|---|
| 6 | Presentation | G.729(A) / G.723(.1) / G.711 |
| 5 | Session | H.323 / H.323 Gateway |
| 4 | Transport | RTP / UDP( / RSVP) |
| 3 | Network | IP (/ WFQ / IP-Prec) |
| 2 | Link | PPP over ATM |
| 1 | Physical | DMT |

PRIOR ART

FIGURE 2

| | |
|---|---|
| VPI, VCI, CID₁ | RTP/UDP/IP header Tx₁ |
| VPI, VCI, CID₁ | RTP/UDP/IP header Rx₁ |
| VPI, VCI, CID₂ | RTP/UDP/IP header Tx₁ |
| VPI, VCI, CID₂ | RTP/UDP/IP header Rx₁ |
| ⋮ | ⋮ |

FIGURE 12

SYSTEM AND METHOD FOR ENHANCING A VOICE CHANNEL IN VOICE OVER INTERNET PROTOCOL

BACKGROUND OF THE INVENTION

1. Field of the Invention

The present invention relates to a system and method for enhancing voice channel transmission in a voice over Internet Protocol (IP), and more specifically, to a method for providing an efficient header transport so as to increase the bandwidth available for data payload transport.

2. Background of the Prior art

In the rapidly changing, deregulated telecommunications marketplace, Internet Service Providers (ISPs) can capitalize on the growing opportunities by introducing value-added services to customers seeking more reliable and economical telecommunications services. The tremendous growth in network infrastructure and corresponding growth in Internet Protocol (IP) traffic has resulted in the use of IP as a platform for new telecommunications services that take advantage of voice and data convergence. Voice over IP (VOIP) technology is one such telecommunications service.

Prior art voice and data convergence (i.e., carrying voice and data within one copper line) has resulted in prior art telephone service adapting from a circuit network to a packet network environment. More specifically, various industry groups are approving protocols and standards (e.g., ITU-T H.323, IETF SIP, H.248, etc.) for VOIP. As a result, prior art VOIP services are available for customers to use VOIP via Internet phone service from a personal computer (PC) or an Ethernet IP phone (e.g., Nortel i2004 telephone, Cisco 7960 telephone), including high speed Internet communications via a high speed access network (e.g., xDSL, Cable modem or WLL).

However, the prior art voice and data convergence provides limited opportunities for CLECs (Competitive Local Exchange Carriers) and ILECs (Incumbent Local Exchange Carriers) to provide VOIP, due to infrastructure limitations. For example, CLECs only have data lines, and would prefer to only transmit data whereas ILECs only have voice lines, and would prefer to provide voice transport due to the high cost of adding data lines. Further, voice and data convergence requires infrastructure for managing multiple telephone lines for customers to use in a home or a small office/home office. In the prior art, these multiple lines are managed at an IAD (Integrated Access Device), which is a terminal where voice and data converge, such that the customer has concurrent data and voice service.

In addition to infrastructure requirements, there is a lack of standardization in VOIP. For example, while the DSL Forum approved the prior art technology and protocol to transmit voice over DSL (called VoDSL) in AAL5, also known as TR-036, in August 2000, the Asynchronous Transfer Mode (ATM) Forum has not yet approved AF-VMOA-0145.000, which uses AAL2. Thus, there is a prior art disadvantage in that no AAL2 standard relating to VOIP over DSL has been approved.

FIG. 1 illustrates a prior art VOIP system 1 configured for phone users to access the Internet via an ADSL (Asymmetric Digital Subscriber Line) network, including a home network having user data devices 3a . . . 3n and a modem 5, an access network having a Digital Subscriber Line Access Multiplier (DSLAM) 11 and a Registration, Administration and Status (RAS) server 13, and a backbone network including the Internet 17 and a VOIP server 19. The user data devices 3a . . . 3n, can be PCs, Internet phones, conventional phones, or any combination thereof. The ADSL Modem (i.e., ATU-R) 5 receives voice data from the user device 3a via a prior art external interface (e.g., 10BaseT Ethernet, USB, Home-PNA) 7, and transmits this voice data to the DSLAM 11 via a copper wire 9. The voice data is then transmitted to the RAS server 13 via an STM-1 connection 15, and eventually to the Internet 17. A VOIP server 19 connected to the Internet 17 provides a prior art interface (e.g., web site) between the receiving user and the transmitting user for routing the voice data to a RAS 13, DSLAM 11 and modem 5 on the receiving side.

As illustrated in FIG. 1, in a prior art method, a user can connect to an Internet service, which requires turning on the modem 5, which in turn attempts to connect to the DSLAM 11. After navigating the Internet 17 for a particular site (e.g., www.dialpad.com), the user, using the prior art RAS 13 via a PPP server, connects to the VOIP server 19, which attempts to contact the receiver of the user's message and make a link. Once the user hits the "send" button on the Internet site to send the phone number, the VOIP server searches a database (i.e., directory) based on the phone number supplied by the user, and attempts to link the user to a destination.

FIG. 2 illustrates the prior art VOIP protocol stack, wherein ITU-T H.323 is used as VOIP protocol to transmit voice over an IP network. An H.323/H.323 gateway forms a multimedia/voice standard for communication between endpoints, and can be used for the VOIP protocol, and covers multimedia. The transport layer always includes RTP/UDP protocol information, and the network layer always includes IP header information.

FIG. 3 illustrates a telephone call placed according to a H.323 call procedure. In phase A, H.225.0 is used for call setup, whereas phase B, phase C and phase E use H.245, and phase E also uses H.225.0. After establishment of communication in phase C, the information flow occurs in phase D, which includes media stream and media stream control flows. It is noted that phase D is not in H.245. Phase D is the heaviest and most intense phase for data processing, whereas the other phases do not have as heavy a load. Because the phases other than phase D are each performed as a single shot, those phases do not load as heavily into the ADSL link. It is expected that RTP will be adapted as the protocol for transmitting voice signals. Thus, phase D using the RTP phase will most heavily load the network.

In the prior art VOIP system 1, the link speed can vary according to the company providing the service. The prior art VOIP system 1 enhances the bandwidth of the prior art copper line, used for approximately 100 years, from 4 KHz bandwidth to 8.1M/0.8 Mbps (downstream/upstream), which is the fastest possible prior art link speed. When the prior art ADSL system 1 is used for symmetric (e.g., voice) data transport, the data transfer rate is 384/384 Kbps, 768/768 Kbps, and differs based on distance. While data service requires a greater download speed than upload speed, voice service requires a substantially similar download and upload speed due to the continuous nature of voice conversation. Thus, the limit of voice service provided by the prior art IAD with ADSL depends on upload speed, which is lower than the download speed.

FIG. 4 illustrates a prior art H.323 data transmission architecture 21. When adapting the prior art H.323 protocol to VOIP, a voice signal is transformed to a digital signal having RTP/UDP/IP headers in the IAD. As illustrated in FIG. 4, a 20-byte IP header 23, followed by an 8-byte UDP header 25 and a 12-byte RTP header 27, are sent in each cell prior to a 20-byte payload 29. Further, the voice signal is sent by a G.726-32 voice codec, and the voice codec generates a 20-byte voice payload at every 5 ms (20-byte/5 ms=4000-byte/1 s=32 Kbps), such that the 20-byte voice payload is inserted into the IP packet. Thus, the IP packet has a size of 60-bytes. However, there is only a 20-byte payload on the 60-byte packet. Thus, the prior art is inefficient in that only 20 of 60 possible bytes, or 33%, are used for payload.

Further, as illustrated in FIG. 4, two AAL5 cells 31, 37 are required to send the voice data. For example, a first 5-byte ATM header 33 is followed by a 48-byte payload 35, and then a second 5-byte ATM header 39 is followed by a 12-byte payload 41, a pad 43 and a tailer 45. Thus, the prior art AAL5 cell has a disadvantage in that the data payload cannot be transported in a single packet due to the high overhead requirements.

FIG. 5 illustrates the prior art VOIP method. Voice packets are transmitted via the cells illustrated in FIG. 4. For example, a phone 3a is attached, via analog line 2, to an IAD 22. The IAD 22 is attached to the DSLAM 11 via an ADSL line, as described above, and the DSLAM 11 is connected to the RAS 13 via an OC-3 or STM-1 line 6, as also described above. The RAS 13 then transmits IP packets to the Internet 17.

In the prior art method of FIG. 5, IP and RTP/UDP protocol information are initially positioned in each AAL5 cell when the data is set up for IP transport at the IAD 22. The AAL5 cell is then transported from the IAD 22 to the RAS 13 via AAL5. The RAS 13 removes AAL5 information and transmits the IP datagram to the Internet 17. The link and physical information is removed prior to the RAS 13 receiving the packet. Thus, the extra overhead of sending the IP header and the RTP/UDP header from the IAD 22 to the RAS 13 have the disadvantage of creating the above-described inefficiencies for the prior art AAL5 transfer method. Accordingly, upload speed is reduced, and overall operational speed is limited, because as noted above, the upload and download speeds must be substantially identical for effective voice communication. Also, fewer concurrent channels (e.g., calls) can be maintained at an adequate quality.

Table 1 shows performance for various prior art code (i.e., code-decode) formats, wherein a low MOS corresponds to a low conversation quality:

| Codec | MOS | Rate | Payload Size | Needed cells | Available calls |
| --- | --- | --- | --- | --- | --- |
| G.711 | 4.3 | 64 Kbps | 40 + 40 bytes | 2-cell/5 ms | 5 |
| G.726 | 3.7 | 32 Kbps | 20 + 40 bytes | 2-cell/5 ms | 5 |
| G.728 | 4.0 | 16 Kbps | 10 + 40 bytes | 2-cell/5 ms | 5 |
| G.729 | 3.8 | 8 Kbps | 10 + 40 bytes | 2-cell/10 ms | 10 |
| G.723.1 | 3.5 | 6.3 Kbps | 20 + 40 bytes | 2-cell/30 ms | 30 |

The voice transfer rate for loading cells into the ADSL link of the AAL5 prior art example is about 153.6 Kbps (2-cell/5 ms=400-cell/s=400*48*8 bps=153.6 Kbps). Thus, the IAD only supports only 5 concurrent calls at an adequate quality (e.g., MOS greater than or equal to 4.0) because of the 800 Kbps upper limit on upload speed. However, this data rate is calculated for voice service only. If the IAD also supports data service, the number of available concurrent calls will be reduced even further. When G.711-64 is used as codec and the frame interval is 5 ms, a 40-byte voice payload results in 80-byte RTP packet due to overhead. Accordingly, 2 AAL5 cells are required to transmit the RTP packet over AAL5.

However, the prior art has various problems and disadvantages. For example, because the upload speed is so much more limited than the downlink speed, there is a shortage of uplink bandwidth due to the prior art method of data transfer. Further, because the UDP header, RTP header and IP header are included in every packet transmitted to the DSLAM 11, VOIP data transport is extremely inefficient (on the order of 67% overhead per data packet), and the AAL5 model for data transport requires more than one packet to transport data. Thus, fewer concurrent calls can be maintained, and the Quality of Service (QoS) cannot be guaranteed. Further, the prior art use of the H.323 protocol (e.g., www.dialpad-.com) is complex and difficult to implement (e.g., too narrow bandwidth for video telephone conferencing), and only one payload of voice data can be transmitted per cell.

SUMMARY OF THE INVENTION

It is an object of the present invention to overcome the problems and disadvantages of the prior art.

An object of the present invention is to increase the number of concurrent calls within a fixed ADSL link, and thus overcome the various problems and disadvantages of the prior art.

A further object of the present invention is to reduce the time cost of transporting a packet from the IAD to the RAS by transforming the data packet to another format for transport between the RAS and the IAD.

It is also an object of the present invention to provide a data structure that has a reduced overhead, can carry more data per packet such that less packets are required, and can meet the continuous transmission needs of voice data.

To achieve these and other objects, a system for transporting voice over Internet protocol (IP) is provided, comprising an integrated access device (IAD), coupled to a user device configured to generate and receive voice data from said user device, said IAD generating a voice data output in a first format which is divided into a plurality of data units having a data identifier without an IP header, and a registration, administration and status (RAS) server that is coupled to said IAD and configured to convert said voice data output between said first format and a second format divided into a plurality of data units, each of said data units having an IP header, and said voice data output is transmitted to a network as said second format.

Additionally, an ATM Adaptation Layer 2 (AAL2) cell configured for transporting voice data between a registration, administration and status (RAS) server and an integrated access device (IAD) is provided, comprising a plurality of common part sublayer-protocol data units (CPS-PDUs). The AAL2 cell, each of said CPS-PDUs comprises a start field positioned adjacent to a CPS-packet, and said CPS-packet comprises a CPS-packet header that comprises a channel identifier (CID) that identifies a user channel corresponding to a user device, and a CPS-packet payload comprising said voice data, wherein said RAS server converts said voice data output from said first format to said second format in accordance with at least said CID.

Further a system for transporting voice data over internet protocol (IP) is provided, comprising an integrated access device (IAD), coupled to a plurality of user devices, each of said user devices configured to generate voice data, via an analog line and receiving said voice data from at least one of said user devices, said IAD generating a voice data output in a first format that comprises an ATM Adaptation Layer 2 (AAL2) cell having a plurality of protocol data units (PDUs). In this system, each of said PDUs comprises a cell header comprising a virtual channel identifier (VCI) and a virtual path identifier (VPI), and a plurality of common part sublayer (CPS)-packets, each of said CPS-packets comprising a CPS-packet header that comprises a channel identifier (CID) that identifies a user channel corresponding to one of said user devices, and a CPS-packet payload comprising said voice data, wherein said RAS server converts said voice data output from said first format to said second format in accordance with said VCI and said VPI and said CID. The system also comprises a registration, administration and status (RAS) server that is coupled to said IAD via an asymmetric digital subscriber line (ADSL) and configured to convert said voice data output between said first format and a second format in accordance with header information stored in a storage device of said RAS server, said second format comprising a RTP/UDP/IP header containing RTP header information, wherein said second format is converted to said first format in accordance with said RTP header information, wherein a first command signal and header information are transmitted from said IAD to said RAS server, said first command signal instructs said RAS server to store said header information in said storage device, a second command signal and header information is transmitted from said IAD to said RAS server in response to a termination decision, and said second command signal instructs said RAS server to remove said header information from said storage device, wherein said storage device comprises a read-only memory (ROM) or a random access memory (RAM). Further, the system comprises a multiplexer coupled to said RAS server via an OC-3 or STM-1 line, wherein said multiplexer is also coupled to said IAD and multiplexes a virtual channel identifier (VCI) and a virtual path identifier (VPI) correlated to said TAD, into said header information, and a network, coupled to said RAS server, that receives and transmits said voice data output in said second format, wherein said RAS server converts said voice data output received from said network, from said second format to said first format, and a first user and a second user are positioned at a common RAS server or different RAS servers, and said first user and said second user are positioned at said common RAS server and at a common IAD or different IADs, and two voice packets can be inserted on said AAL2 cell.

Additionally, a method of transmitting voice over Internet protocol (VOIP) is provided, comprising processing a user-generated request signal in an integrated access device (IAD), generating and transmitting a first command signal to a registration, administration and status (RAS) server, transporting voice data on an AAL2 cell generated in said IAD, said AAL2 cell not including a RTP/UDP/IP header, and upon a user termination request, generating and transmitting a second command signal to said RAS server.

Also another method of transmitting voice over an Internet protocol (IP) is provided, comprising receiving a first command signal and header data in a registration, administration and status (RAS) server, storing header information for transmitting to a network in a memory storage device, in accordance with said header data and said first command signal, said RAS server receiving a voice data in a first format from a device, and converting said voice data from said first format into said second format in said RAS server, and transmitting said voice data in said second data format to said network.

Also provided is a method of transmitting voice over an Internet protocol, comprising generating a voice data packet having a first format in a device, converting said voice data packet from said first format to a second format at a converter, and in accordance with data packet address information, and transporting said data packet having said second format to a network, wherein said data packet comprises voice data generated in accordance with a user-generated request.

Further, a method of transmitting voice data over Internet protocol (VOIP) is provided, comprising processing a user-generated request signal in an integrated access device (IAD), generating and transmitting a first command signal that instructs said RAS server to store header data in a data storage device, and header data that comprises RTP/UDP/IP header information, to a registration, administration and status (RAS) server, and transporting voice data on an AAL2 cell generated in said IAD. In this method, the AAL2 cell comprises a cell header comprising a virtual channel identifier (VCI) and a virtual path identifier (VPI), and a plurality of common part sublayer (CPS)-packets, each of said CPS-packets comprising a CPS-packet header that comprises a channel identifier (CID) that identifies a user channel corresponding to one of said user devices, and a CPS-packet payload comprising said voice data, wherein said RAS server converts said voice data output from said first format to said second format in accordance with said VCI and said VPI and said CID, said AAL2 cell not including a RTP/UDP/IP header, wherein a voice data payload is transported on said AAL2 cell.

Another method of transmitting voice over an Internet protocol (IP) is provided, comprising receiving a first command signal and header data comprising RTP/UDP/IP header information in a registration, administration and status (RAS) server, storing RTP/UDP/IP header information in a memory storage device in said RAS server, in accordance with said header data and said first command signal, said RAS server receiving a voice transmission in a first format from a first device, and converting said voice data from said first format into said second format in said RAS server, and transmitting said voice transmission in said second data format to a network. The method also comprises removing said RTP header information from said memory storage device in accordance with a second control signal to terminate said method, wherein an integral access device (IAD) transmits said first command signal and said second command signal to said RAS server, wherein said converting step comprises one of (a) receiving said voice transmission in said first format that comprises an AAL2 cell having no RTP/UDP/IP header, and having a CPS-packet header comprising a channel identifier (CID) that corresponds to a user interface, and a virtual channel identifier (VCI) and a virtual path identifier (VPI) that corresponds to a first device identifier; and forming said second format as an IP header by inserting said RTP/UDP/IP header from said memory storage device in accordance with said VCI, VPI and CID, extracted from said first format, wherein said said first device comprises an integral access device (IAD), and (b) receiving said voice transmission in said second format that comprises an IP packet having a RTP/UDP header, and forming said first format that comprises an AAL2 cell having a CPS packet, said AAL2 cell being formed by stripping said IP/UDP header to extract an RTP packet, matching information from said RTP/UDP/IP header with information in said memory storage device to select a virtual channel identifier (VCI) and a virtual path identifier (VPI) and a channel identifier (CID), inserting said VCI and VPI into a header and inserting said CID into a CPS packet header, and adding said voice payload to said CPS packet, wherein said first device comprises said network and a second device comprises an integral access device (IAD).

A communications device is also provided, comprising an integrated access device (IAD), coupled to a voice data device, and to a registration, administration and status (RAS) server, wherein said IAD transmits voice data between said voice data device and said RAS in a first format that comprises an ATM Adaptation Layer 2 (AAL2) that includes a cell header having a virtual channel identifier (VCI) and a virtual path identifier (VPI) and a common part sublayer (CPS) packet that comprises a CPS-packet header having a channel identifier (CID) and a CPS-packet payload having voice data, and wherein said voice data in said first format does not include a RTP/UDP/IP header.

Also, a method of operating an integrated access device (IAD) is provided, comprising the steps of: receiving voice data from a transmitting device indicative of a Tx/Rx channel decision, generating a first command signal in accordance with a said Tx/Rx decision to instruct a registration, administration and status (RAS) server to store header data and an identifier for said IAD and said transmitting device, and transmitting said voice data to said RAS server in accordance with said first command signal.

A registration, administration and status (RAS) server is provided, comprising a memory storage device that stores header data in accordance with a first command signal, and removes said header data in accordance with a second command signal, and a processor that converts voice data between a first format and a second format in accordance with said header data, wherein said first format comprises an RTP/UDP/IP header for transporting said voice data over IP, and said second format comprises an AAL 2 cell having a plurality of protocol data units for transporting said voice data between said RAS server and a user.

BRIEF DESCRIPTION OF THE DRAWINGS

The accompanying drawings, which are included to provide a further understanding of preferred embodiments of the present invention and are incorporated in and constitute a part of this specification, illustrate embodiments of the invention and together with the description serve to explain the principles of the drawings.

FIG. 2 illustrates a prior art VOIP protocol stack;

FIG. 12 illustrates a data storage structure for the preferred embodiment of the present invention;

DETAILED DESCRIPTION OF THE INVENTION

Reference will now be made in detail to the preferred embodiment of the present invention, examples of which are illustrated in the accompanying drawings. In the present invention, the terms are meant to have the definition provided in the specification, and are otherwise not limited by the specification.

The preferred embodiment of the present invention includes a novel method for VOIP, as well as a novel IAD and a novel RAS that can convert voice data between a first format (i.e., RTP/UDP/IP) and a second format (i.e., AAL2 CPS), for efficient voice data transport. When the preferred method of the present invention is transmitted over an ADSL system, the characteristics of AAL2 are also available, including multiplexing functions, such that several short CPS-Packets can be multiplexed into a single ATM cell to increase transport efficiency.

In the preferred embodiment of the present invention, more than one user input (e.g., phone, PC phone, and Internet phone) can be connected to each IAD, and more the one IAD can be corrected to each RAS. However, each IAD always processes the AAL2-CPS cell, and the RAS header converts between the AAL2-CPS packet format and the RTP format, depending on the direction of the voice data. According to this format conversion scheme, several payloads can be carried on a single AAL2 cell.

More specifically, the preferred embodiment of the present invention is a fixed ADSL system that transmits voice packets from the IAD to the RAS via AAL2, without the overhead of the RTP/UDP and IP header, which is stored in advance in the RAS. The RTP/UDP and IP layers are removed prior to transport from the IAD to the RAS to increase throughput as well as the number of concurrent calls on the ADSL link, and the RAS subsequently adds the stored RTP/UDP and IP header information to the received voice packet for Internet transport as an IP packet. Several short CPS-packets are multiplexed into a single ATM cell. In the present invention, the IAD generates the AAL2-CPS packet for the RAS, the RAS generates the RTP packet for delivery to the network, and the RAS generates the AAL2-CPS packet for the IAD to receive voice data from the network.

Figure 6:
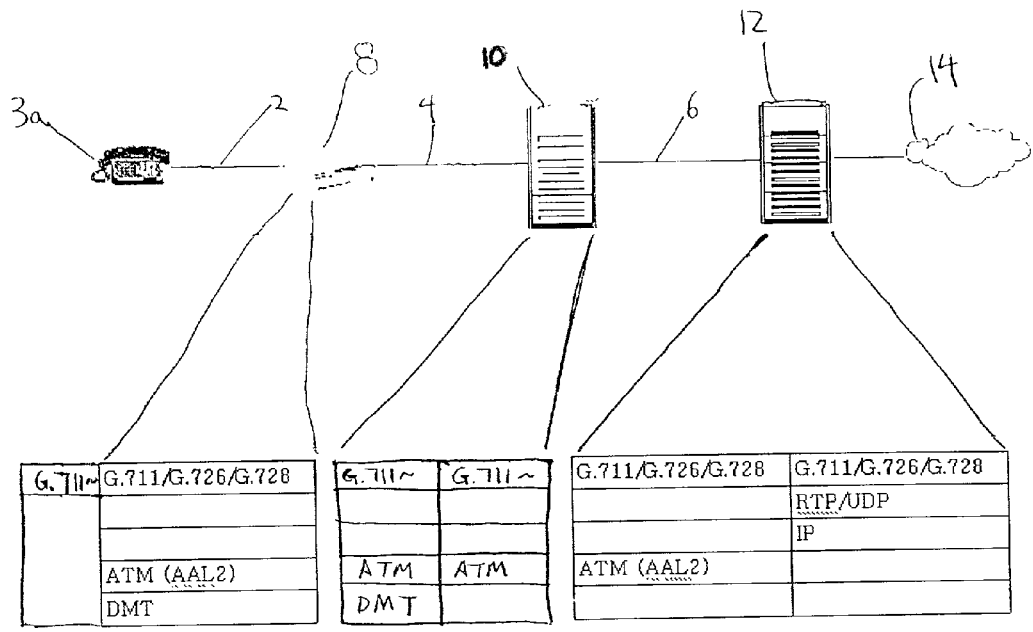
FIG. 6 illustrates a data transport system and method according to the preferred embodiment of the present invention.

FIG. 6 illustrates the system and method according to the preferred embodiment of the present invention. The prior art phone 3a and analog line 2 are provided. However, as shown in FIG. 6, the IAD 8 of the preferred embodiment of the present invention differs from the IAD 22 of the prior art, in that an AAL2 cell is used, and there is AAL2 emulation from the IAD 8 to the RAS 12. No RTP/UDP header or IP header is produced in the IAD 8 for transmission to the DSLAM 10 via the ADSL line 4. Further, the RTP/UDP and IP header information is not added to the packet until the packet arrives in the RAS 12 when the packet is converted to an IP packet for transport via the Internet 14. Thus, the RAS 12 of the present invention is different from the prior art RAS 13.

For receiving data, the preferred embodiment of the present invention illustrated in FIG. 6 shows that the RAS 12 receives the data packet from the Internet 14, including the RTP/UDP header and the IP header. Then, the RTP/UDP header and IP header are removed from the data packet, and the ATM (AAL2) information is added by the RAS 12. As noted below, the RAS 12 may also include a data lookup table that cross-references values to correctly add and remove header information and ATM information. Thus, the DSLAM 10 and IAD 8 receive data packets from the RAS 12 that do not include the RTP/UDP header information and IP header information.

Figure 7:
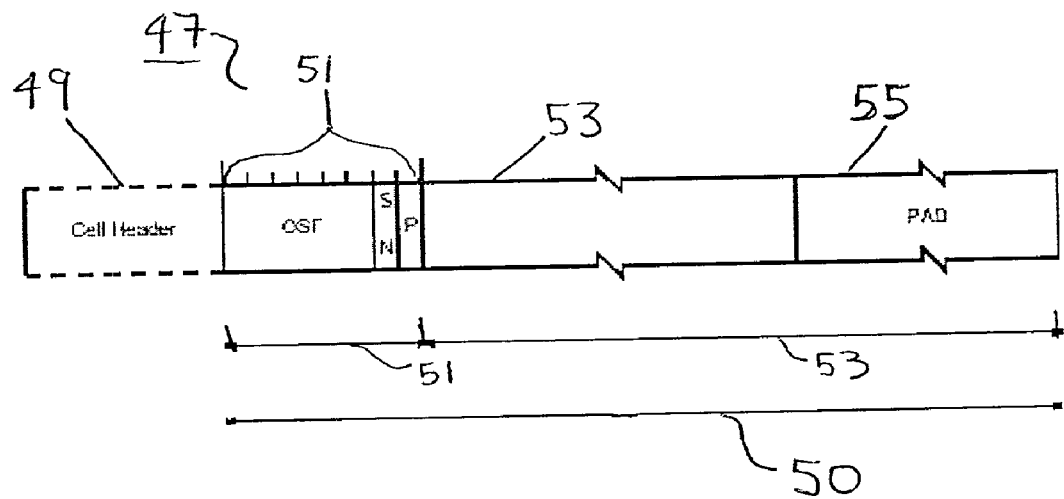
FIG. 7 illustrates a data structure of an AAL2 cell according to the preferred embodiment of the present invention.
Figure 8:
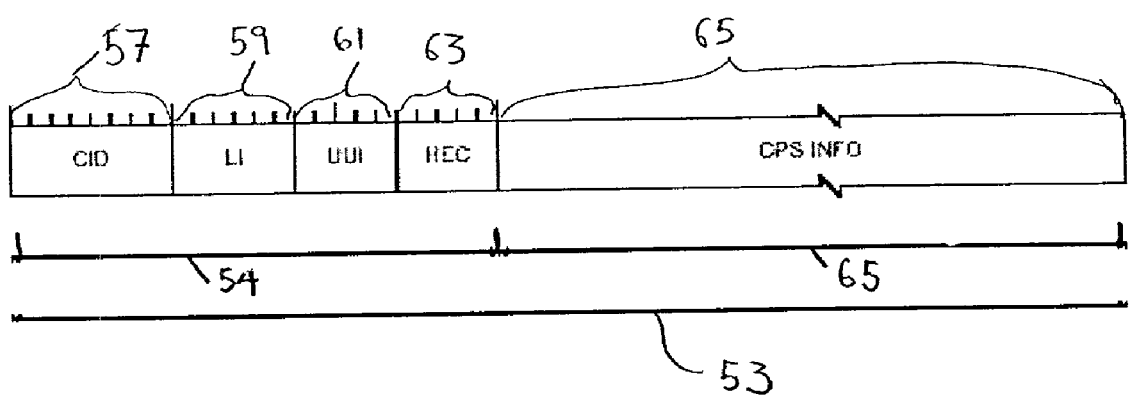
FIG. 8 illustrates a data structure of a CPS packet according to the preferred embodiment of the present invention.

FIGS. 7 and 8 illustrate the data structure according to the preferred embodiment of the present invention. FIG. 7 illustrates a data packet 47 according to the preferred embodiment of the present invention. A cell header 49 that includes a virtual channel identifier (VCI) and a virtual path identifier (VPI) is provided, followed by the CPS-PDU 50, also known as the CPS-packet, which includes a start field 51 that includes an offset field OSF, a sequence number SN and a parity bit P. The start field 51 is positioned as a spacer between each CPS-PDU. The CPS-PDU payload includes the data payload 53 and padding 55.

FIG. 8 illustrates the CPS-PDU payload 53, including a CPS-packet header (CPS-PH) 54 positioned at the start of the CPS-PDU payload 53. A channel identifier CID 57 that identifies a user channel corresponding to one of the user devices, a length indicator 59 that identifies the length of the payload of the CPS-packet, a user-to-user indication 61 that provides a link between the CPS-packet and a service-specific convergence sublayer (SSCS), a head error control 63 and the CPS-INFO 65, which is the data in the payload, are also included. The CPS-PH substantially eliminates any problems associated with transporting the CPS-PDU to its correct location without the RTP/UDP header and IP header information. Thus, the RTP/UDP header and IP header information can be removed from the data packet as illustrated in FIG. 6 and also described below.

The CID 57 is related to the user device, such that each different user device attached to an IAD 8 has a different CID 51. Further, the VCI and VPI information in the header 49 is related to the IAD 8, such that the RAS 12 can distinguish between more than one IAD 8. Thus, with the VCI, VPI and CID information, the RAS can find the particular IAD-user device combination for a given voice data packet, which is correlated with an RTP header in the lookup table (e.g., database) illustrated in FIG. 13.

As illustrated in FIG. 7, when AAL2 is used, a maximum of 65-octets can be transmitted using 1-octet of the start field 51. Further, several CPS-packets as illustrated in FIG. 8, can be multiplexed to one CPS-PDU, and separated by start fields 51. For example, if the voice codec of G.726-32 is used, every 5 ms a 20-byte voice packet occurs at the coder. When this packet is transmitted using AAL2, only a 23-byte CPS-Packet is needed, including a 3-byte CPS-packet header. Further, when the above-described multiplexing characteristics are used, 2 voice packets can be inserted into a single ATM cell (23+23<47).

For the preferred embodiment of the present invention, FIGS. 9–13 illustrate various methods, as discussed in more detail below.

Figure 9:
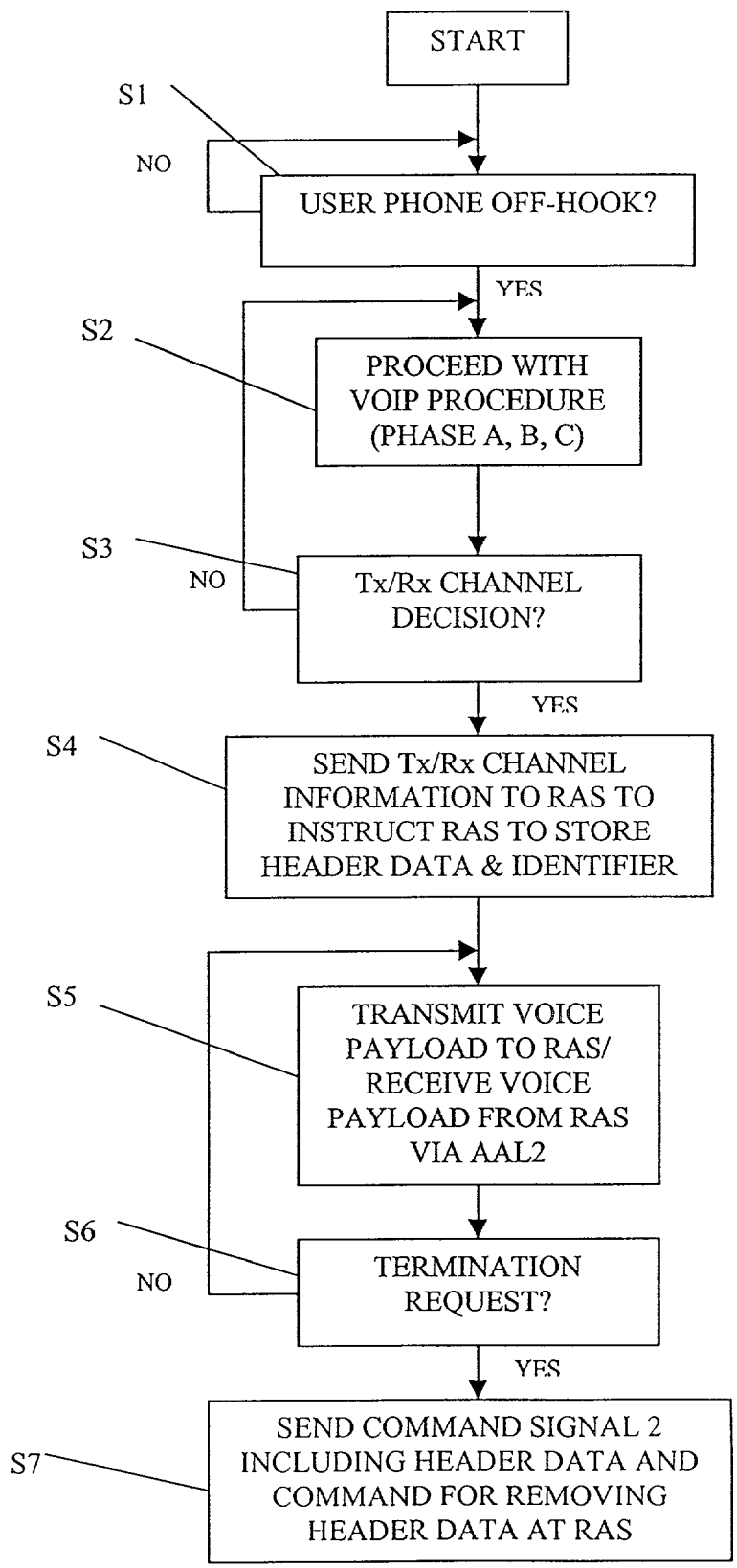
FIG. 9 illustrates a method of transporting and receiving the data packet in an IAD according to the preferred embodiment of the present invention.

FIG. 9 illustrates a method of operating the IAD 8, according to the preferred embodiment of the present invention. The IAD 8 outputs the data structure illustrated in FIGS. 7–8 to the RAS 12, as well as receiving and processing data from the RAS 12. While the present method is described for a single user PC phone or Internet connection, the present invention is not limited thereto, and may include a plurality of such devices in various combinations, as well as analog phones and the like.

In a first step S1, the IAD 8 checks to see if a user's phone 3a is off the hook. The first step S1 is repeated if a hook-off is not detected. However, if a hook-off is detected, a second step S2 permits normal VOIP procedure to proceed, including phases A, B and C, as illustrated in FIG. 3.

Figure 1:
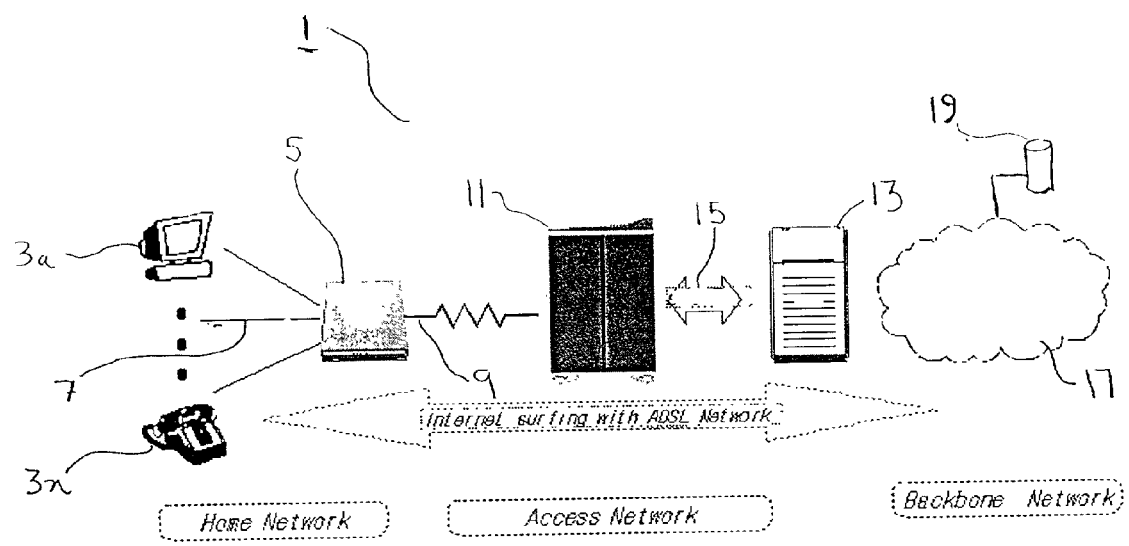
FIG. 1 illustrates a prior art ADSL network for accessing the Internet.
Figure 3:
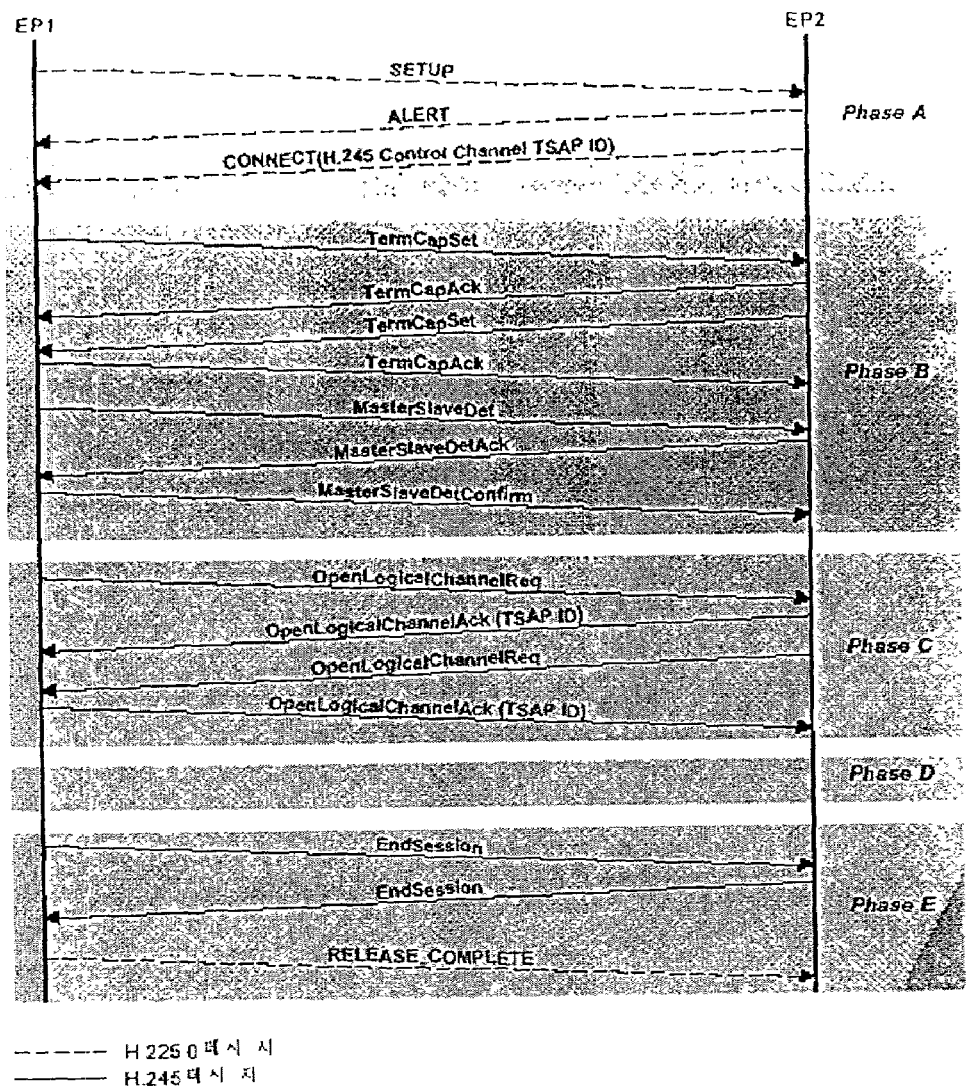
FIG. 3 illustrates a prior art H.323 call procedure.
Figure 4:
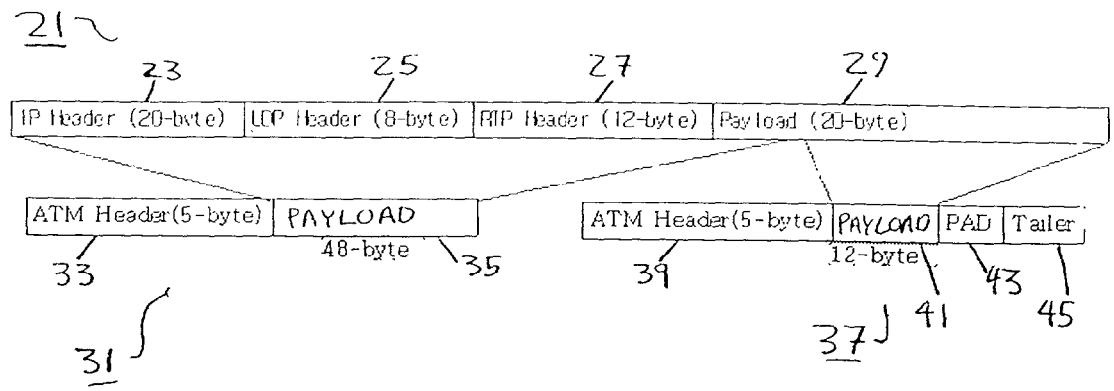
FIG. 4 illustrates a prior art data packet structure.
Figure 5:
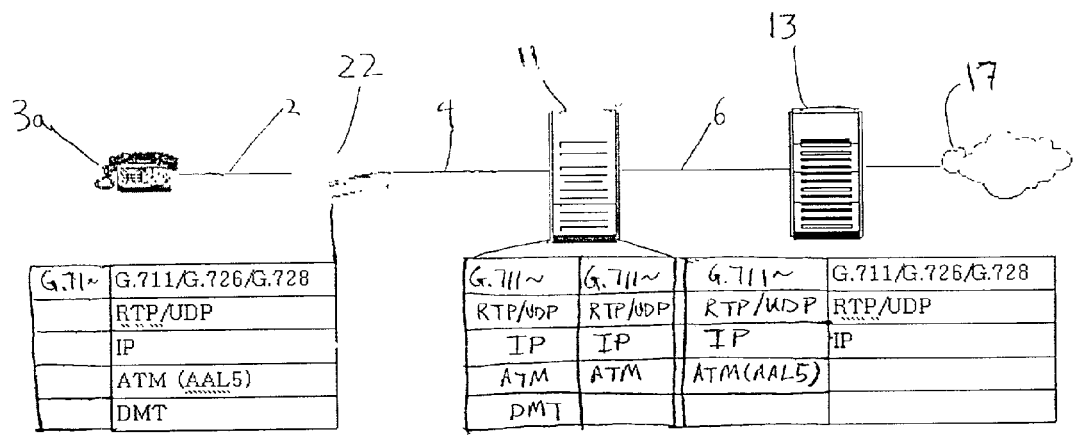
FIG. 5 illustrates a prior art data transport structure and method, including data architecture.

A third step S3 is the start of phase D, illustrated in FIG. 3. However phase D is not carried out in the substantially same manner as the prior art. The IAD 8 determines whether there has been a Tx/Rx channel decision. If there has been no such decision, the second the third steps S2, S3 are repeated until a transmission or reception decision has been made, at which point a fourth step S4 is performed as described below.

If a Tx/Rx channel decision detected in the third step S3, then in a fourth step S4, the IAD 8 sends Tx/Rx information to the RAS 12, to instruct the RAS 12 to store header data and an identifier, including a first command signal, including channel data (e.g., RTP/UDP and IP header data), to the RAS 12, including a command for storing the RTP/UDP and IP header data in the lookup table of the RAS 12. The Tx/Rx channel information may include the first command signal, header data and an identifier (e.g., VPI/VCI/CID information).

In a fifth step S5, the voice payload is then transmitted via AAL2 to the RAS 12. The fifth step S5 continues until termination is detected in an sixth step S6. The termination of the fifth step S5 corresponds to the end of phase D as illustrated in FIG. 3. As noted above, the method of the present invention is substantially different from the prior art method illustrated in FIG. 3.

Once termination has been detected in the sixth step S6, which is the start of phase E as illustrated in FIG. 3, a second command signal is sent to the RAS 12, instructing the RAS 12 to remove the RTP/UDP and IP header information stored in the RAS 12 based on the first command signal provided in the fourth step S4. The seventh step S7 is conducted, regardless of whether data is being transmitted or received by the IAD 8, to end the present invention method.

While the RAS 12 can remove the header in the seventh step S7 in accordance with the second command signal and the header information, it is also possible for the RAS 12 to remove the header in the seventh step S7 without the header information according to an alternate embodiment of the present invention. Such an alternate embodiment is possible, because the second command signal can include VPI/VCI/CID information.

Figure 10A:
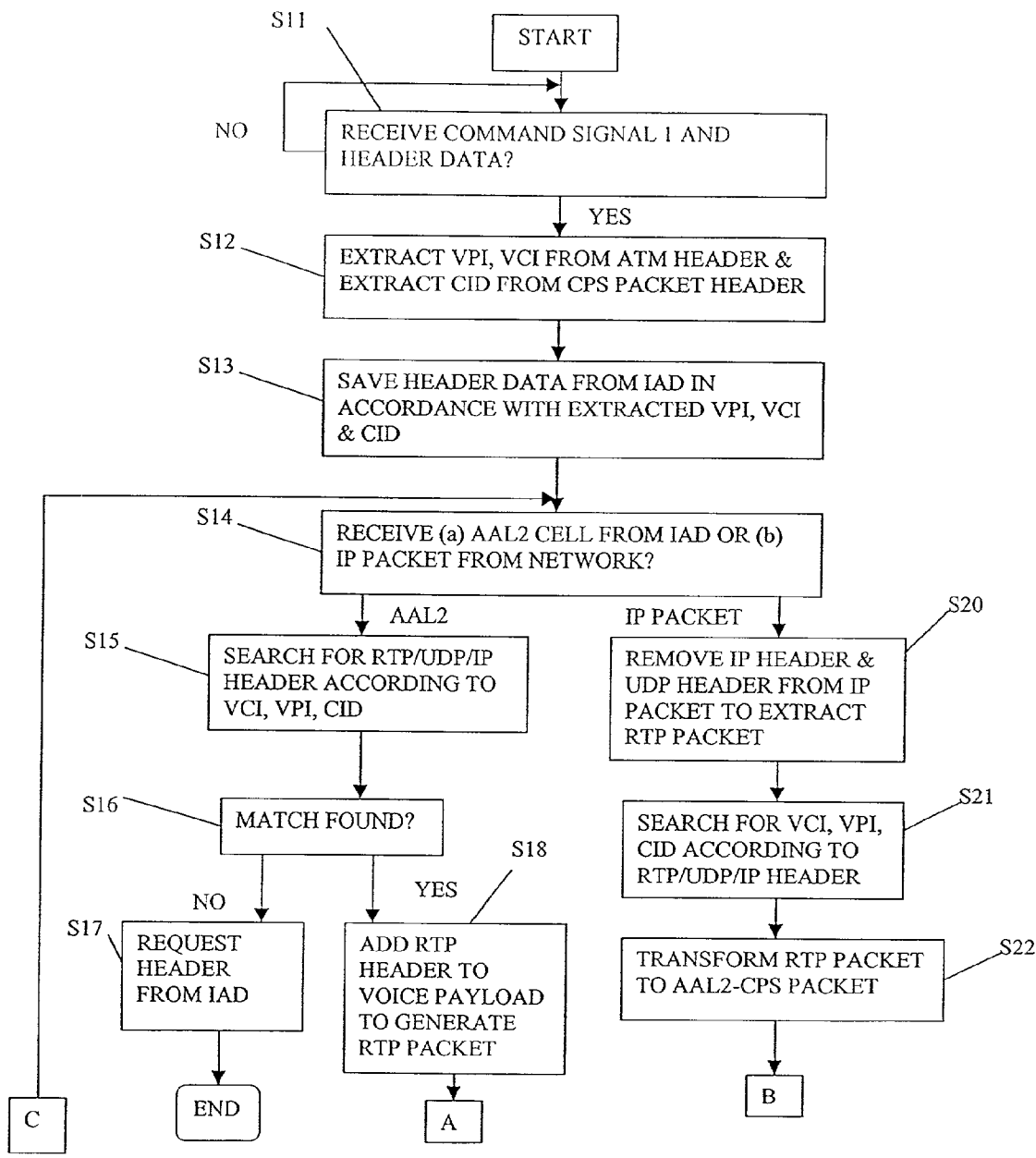
FIGS. 10(a) and 10(b) illustrate a method of receiving a transporting the data packet in a RAS according to the preferred embodiment of the present invention.
Figure 10B:
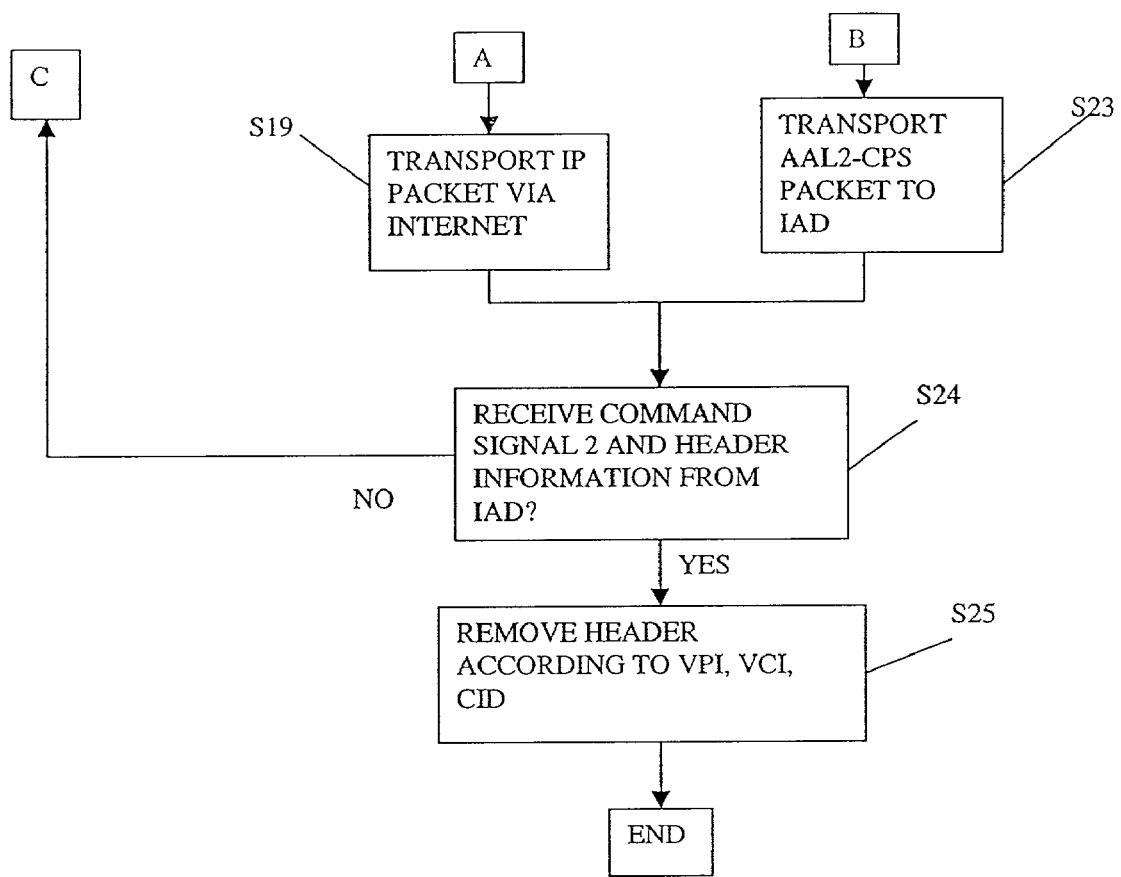

FIGS. 10(a)–(b) illustrate a method of operating the RAS 12 according to the preferred embodiment of the present invention. The RAS 12 receives the data structure as illustrated in FIGS. 6–8 from the IAD 8 and converts it to an IP packet and transports it to the Internet 14, as well as receiving and processing data from the Internet 14 and transmitting data to the IAD 8.

In a first step S1, the RAS 12 checks whether the first command signal, along with RTP/UDP and IP header information, has been received from the IAD 8 via AAL2. If the first step S11 indicates a transmission from the IAD 8 via AAL2, in a second step S12, the RAS 12 extracts the VCI and VPI from the cell header 49 and the CID from the CPS-packet 53. In a third step S13, the RAS 12 saves RTP/UDP and IP header data from the IAD 8, in accordance with the VPI, VCI and CID.

In another alternate embodiment of the present invention, the RAS 12 can store VPI/VCI/CID identifier information and its corresponding header in the third step S13. Correspondingly, the header and identifier must both be removed in accordance with the second command signal in the seventh step S7 illustrated in FIG. 9.

In a fourth step S14, it is determined whether an AAL2 cell or an IP packet has been received. If an AAL2 transmission is received from the IAD 8, the RAS 12 searches for the RTP/UDP/IP header that corresponds to a specific IAD and communication device combination, according to the VPI, VCI and CID information contained in the database in the RAS 12 in a fifth step S15. In a sixth step S16, if no match is found in the database (i.e., lookup table), which is indexed according to VPI, VCI and CID, then in a seventh step S17, the RAS 12 sends a header request to the IAD 8, and the method is completed.

If a match is found, then in a eighth step S18, the RAS 12 adds the RTP/UDP/IP header, including RTP/UDP information and IP information, from the database to the voice payload, and sends the RTP packet to the network as an IP packet in a ninth step S119. The fifth through ninth steps S15–S19 correspond to the RAS 12 receiving voice data transmitted from the IAD 8 for transport via the Internet. The IAD 8 transmits that voice data as illustrated in FIG. 9 and described above in further detail.

In a tenth step S20, if an RTP packet (i.e., IP packet converted to an RTP packet by the RAS 12) is received from the network, the RAS 12 removes the IP header and the UDP header from the IP packet to extract a RTP packet. In an eleventh step S21, the RAS 12 searches for the VCI, VPI and CID information in the database (i.e., header data table) of the RAS 12, according to the RTP information received from the IP packet received from the network. In a twelfth step S22, the RTP packet is transformed to an AAL2 CPS-packet for transport, and transported to the IAD 8 in a thirteenth step S23. The tenth through thirteenth steps S10–S13 correspond to the RAS 12 receiving voice data from the network 14 and transmitting the voice data to the IAD 8. The IAD processes the received data as illustrated in FIG. 9 and described in greater detail above.

In a fourteenth step S24, the RAS 12 determines whether the second command signal, including VPI, VCI and CID header data for removing the header data stored in the RAS 12, has been received from the IAD 8. If the second command signal has been received by the RAS 12, in a fifteenth step S25, header information is removed from the RAS 12 database according to VPI, VCI and CID information from the IAD 8. In the above-disclosed alternate embodiment of the present invention, VPI/VCI/CID identifier information and header information stored in the RAS 12, is removed in the fifteenth step S25 of FIG. 10(b). The fifteenth step S25 corresponds to the beginning of phase E as illustrated in FIG. 3.

Figure 11A:
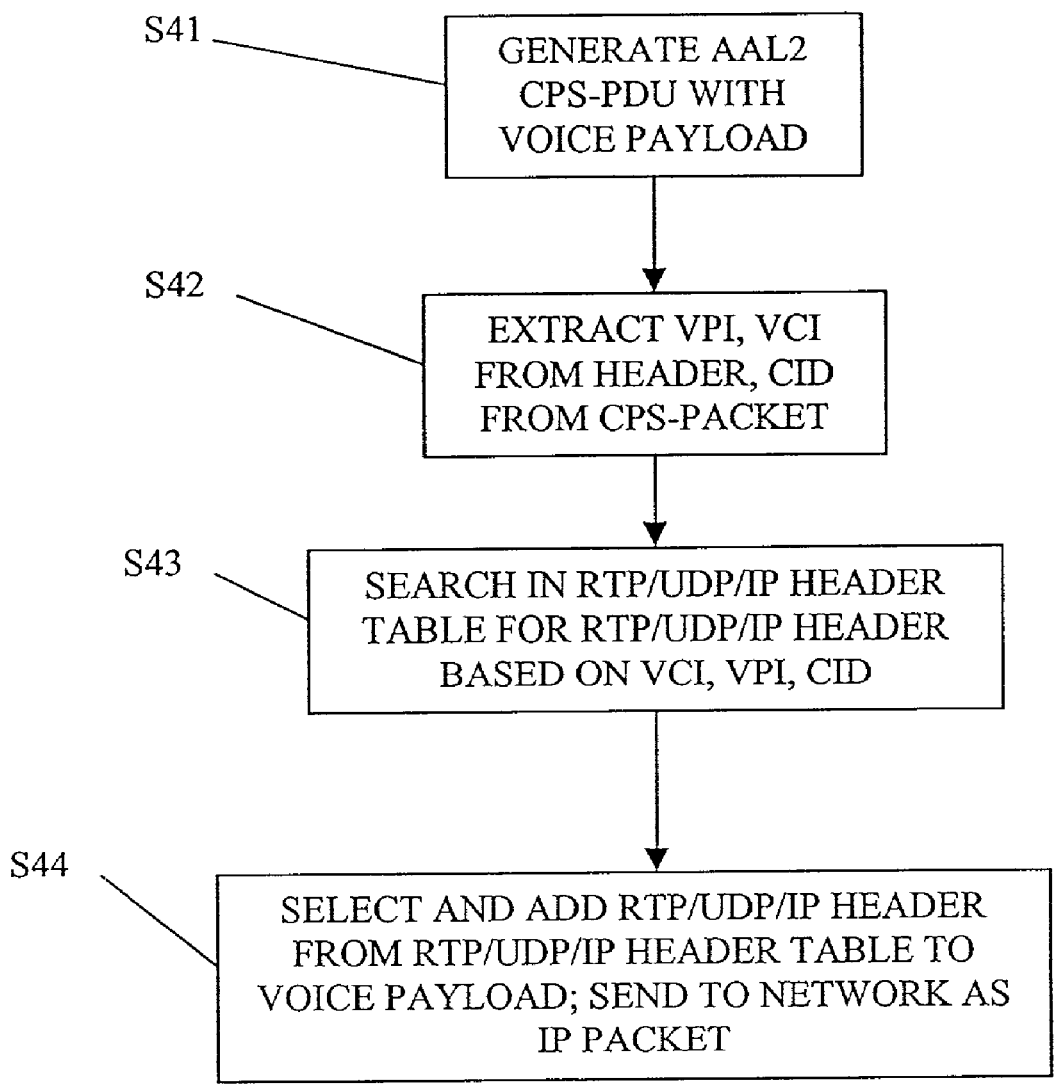
FIGS. 11(a) and 11(b) respectively illustrate a method of adding and removing the header information from a data packet transported according to the preferred embodiment of the present invention.
Figure 11B:
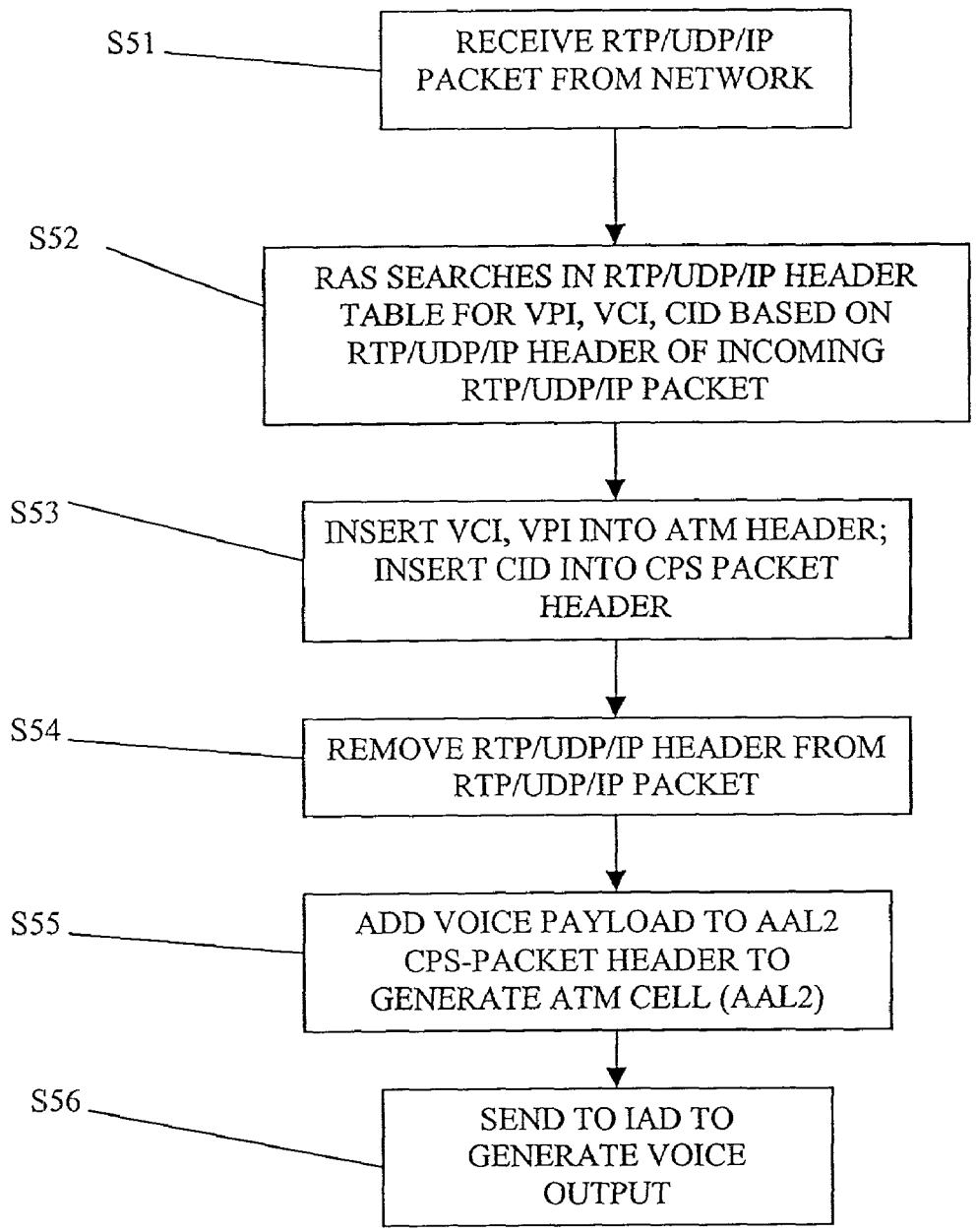

FIGS. 11(a) and 11(b) respectively illustrate the method of preparing the data packet for transport to the network 14 and the IAD 8. As shown in FIG. 11(a), in a first step S41, the database of the RAS 12 receives an AAL2 output, for example, from the IAD 8. In a second step S42, the database extracts VPI, VCI and CID from the AAL2 data packet. In a third step S43, the database searches for an RTP/UDP/IP header in the RTP/UDP/IP header table according to instructions from the extracted VPI, VCI and CID information. In a fourth step S44, the RTP/UDP/IP header found in the RTP/UDP/IP header table is added to the voice payload, which is then sent to the network as an IP packet.

FIG. 11(b) illustrates a method for preparing an IP packet received from the network 14 for transport to the IAD 8, and to a user. An IP packet is received from the network, and the RAS 12 receives it as a RTP/UDP/IP packet in a first step S51. In a second step S52, the RAS 12 searches in the database (i.e., RTP/UDP/IP header table) for a VPI, VCI and CID combination in accordance with the RTP header of the incoming RTP packet from the network. Next, the VPI, VCI information is inserted into the ATM header and the CID information is inserted into the CID-packet header in a third step S53. In a fourth step S54, the RTP header is removed from the RTP packet, and in a fifth step S55, the voice payload is added to the AAL2-CPS-packet header created in the third step S53 to generate the AAL2 ATM cell. In a sixth step S56, voice data is output to the user.

FIG. 12 illustrates the data structure of the database according to the preferred embodiment of the present invention. As can be seen from the above-described method, transmission and reception data is provided in separate rows for transmission and reception of the IAD 8. Further, RTP/UDP/IP header is provided for all combinations of VPI, VCI and CID information, such that the RTP/UDP/IP header information may be the same in a given field of the database, whereas the transmission/reception information and the VPI, VCI and CID information may change.

Figure 13:
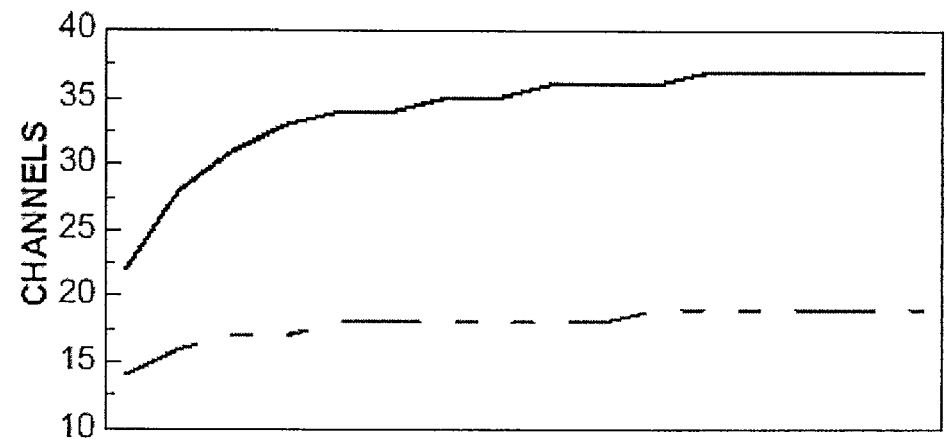
FIG. 13 illustrates simulation results of the number of AAL2 voice channels in the DS1 Trunk compared between the preferred embodiment of the present invention and the prior art method.
Figure 14:
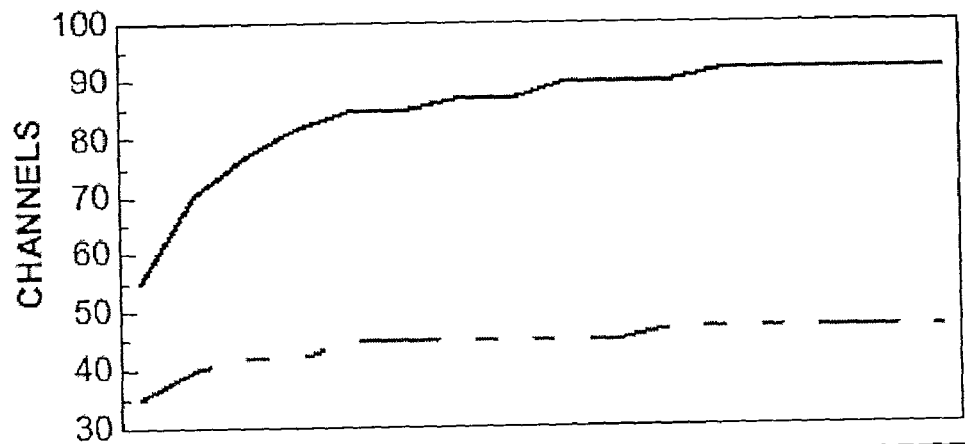
FIG. 14 illustrates simulation results of the number of AAL2 silence suppressed voice channels in the DS1 Trunk compared between the preferred embodiment of the present invention and the prior art method.

FIGS. 13 and 14 illustrate graphical comparisons between simulations performed for the prior art system described above, and the preferred embodiment of the present invention, to determine the efficiency of channel usage. The decided codec is G.726-32 and transmission media is DS1 Trunk (total 1.544 Mbps, data speed is 1.536 Mbps except sync).

The prior art DS1 Trunk transmits at 192K-byte per second, which corresponds to 4000-cells. If an RTP packet is transmitted at a 5 ms frame interval, 2-cells are transmitted every 5 ms, which corresponds to 400-cells per channel. Thus, only 10 channels are available in a DS1 Trunk. Further, the prior art uses a voice activity detection function. However, if a silence suppressed voice is used, the efficiency can be doubled, such that 20 channels are available in a DS1 Trunk. FIG. 13 illustrates a comparison between the results of the prior art DS1 Trunk and the preferred embodiment of the present invention.

When the preferred embodiment of the present invention is applied, there is about 0.5-cell every 5 ms, such that about 34 channels are available in the DS1 Trunk. Further, if silence suppressed voice is used, about 85 channels are available in the DS1 Trunk. FIG. 14 illustrates graphical representations of the aforementioned simulation results, as compared with the prior art.

The present invention has various advantages that overcome at least the above discussed problems and disadvantages of the prior art. The function that is a part of the preferred embodiment of the present invention, provides an advantage in that it enhances cell utilization in the ATM layer. The preferred method of the present invention also has the advantage of increasing the bandwidth of the voice channels in an ADSL system four-fold, and remedying the problems of the prior art ADSL-based Access Network system, including the shortage of upstream bandwidth.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A system for transporting voice over Internet protocol (IP), comprising:
an integrated access device (IAD), coupled to a user device and configured to generate and receive voice data from said user device, said IAD generating a voice data output in a first format which comprises received voice data that is divided into a plurality of first data units having a data identifier without an IP header wherein a plurality of first data units are multiplexed into a single transport cell; and
a registration, administration and status (RAS) server that is coupled to said IAD and configured to convert said voice data output between said first format and a second format which comprises said received voice data that is divided into a plurality of second data units, each of said second data units having an IP header, and said voice data output is transmitted to a network as said second format.

2. The system of claim 1, further comprising a first command signal transmitted from said IAD to said RAS server, wherein said first command signal instructs said RAS server to store said header information in a storage device, and said RAS server converts between said first format and said second format in accordance with said header information in said storage device.

3. The system of claim 2, further comprising a second command signal transmitted from said IAD to said RAS server in response to a transmission termination decision, wherein said second command signal instructs said RAS server to remove said header information from said storage device.

4. The system of claim 3, wherein header information is also transmitted with said first command signal and said second command signal.

5. The system of claim 2, wherein said storage device is in said RAS server and comprises a static memory or a dynamic memory.

6. The system of claim 5, wherein said static memory comprises a read-only memory (ROM) device, and said dynamic memory comprises a random access memory (RAM) device.

7. The system of claim 1, wherein said second format comprises an RTP/UDP header containing RTP header information and an IP header, wherein said second format is converted to said first format in accordance with said RTP header information.

8. The system of claim 1, further comprising a voice over IP server coupled to said network for routing said voice data output in said second format from a first user to a second user.

9. The system of claim 1, further comprising at least one additional user device positioned with said user device at a common RAS server or at different RAS servers.

10. The system of claim 9, wherein said user device and said at least one additional user device are positioned at said common RAS server, and at a common IAD or at different IADs.

11. The system of claim 1, further comprising:
an analog line coupling said user device to said IAD;
a multiplexer coupled between said IAD and said RAS server; and
an OC-3 or STM-1 line coupling said multiplexer to said RAS server, wherein said multiplexer multiplexes a virtual channel identifier (VCI) and a virtual path identifier (VPI), which are correlated to said IAD, into said header information.

12. The system of claim 1, wherein silence suppressed voice is applied, and 85 channels are available in a transmission media for said system.

13. A system for transporting voice over Internet protocol (IP), comprising:
an integrated access device (IAD), coupled to a user device configured to generate and receive voice data from said user device, said IAD generating a voice data output in a first format which is divided into a plurality of data units having a data identifier without an IP header; and a registration, administration and status (RAS) server that is coupled to said IAD and configured to convert said voice data output between said first format and a second format divided into a plurality of data units, each of said data units having an IP header, and said voice data output is transmitted to a network as said second format,
said first format comprising an ATM Adaptation Layer 2 (AAL2) cell having a plurality of protocol data units (PDUs), each of said PDUs comprising:
a cell header comprising a virtual channel identifier (VCI) and a virtual path identifier (VPI); and
a plurality of common part sublayer (CPS)-packets, each of said CPS-packets comprising,
a CPS-packet header that comprises a channel identifier (CID) that identifies a user channel corresponding to said user device, and
a CPS-packet payload comprising said voice data, wherein said RAS server converts said voice data output from said first format to said second format in accordance with said VCI and said VPI and said CID.

14. The system of claim 13, wherein at least two voice packets can be inserted on said AAL2 cell.

15. The system of claim 13, said CPS-packet header further comprising:
a length indicator that identifies the length of a payload of said CPS-packet;
a user-to-user indication that provides a link between said CPS-packet and a service-specific convergence sublayer (SSCS); and
a head error control, wherein said PDU further comprises an offset field, a sequence number and a parity bit in a start field positioned between each of said CPS-packets.

16. An ATM Adaptation Layer 2 (AAL2) cell configured for transporting voice data between a registration, administration and status (RAS) server and an integrated access device (IAD), comprising a plurality of common part sublayer-protocol data units (CPS-PDUs), each of said CPS-PDUs comprising a start field positioned adjacent to a CPS-packet, said CPS-packet comprising:
a CPS-packet header that comprises a channel identifier (CID) that identifies a user channel corresponding to a user device, and
a CPS-packet payload comprising said voice data, wherein said RAS server converts said voice data output from a first format to a second format in accordance with at least said CID,
further comprising:
a cell header comprising a virtual channel identifier (VCI) and a virtual path identifier (VPI), which are correlated to said IAD, and RTP/UDP/IP header data, including RTP header information; and
a command signal that instructs said RAS server to store said RTP header information prior to voice data transmission, and to subsequently store said VCI, said VPI and said CID in accordance with said RTP information, or instructs said RAS server to remove said RTP header information prior to termination of said transmission.

17. The AAL2 cell of claim 16, wherein header information is included with said command signal.

18. The AAL2 cell of claim 16,
wherein said start field further comprising an offset field, a sequence number and a parity bit positioned before or after said CPS-packet.

19. The AAL2 cell of claim 18, wherein a RTP/UDP header and an IP header are added to said CPS-PDU to generate an IP packet for transport on a network.

20. The AAL2 cell of claim 16, said CPS-packet header further comprising:
a length indicator that identifies the length of a payload of said CPS-packet;
a user-to-user indication that provides a link between said CPS-packet and a service-specific convergence sublayer (SSCS); and
a head error control.

21. An ATM Adaptation Layer 2 (AAL2) cell configured for transporting voice data between a registration, administration and status (RAS) server and an integrated access device (IAD), comprising a plurality of common part sublayer-protocol data units (CPS-PDUs), each of said CPS-PDUs comprising a start field positioned adjacent to a CPS-packet, said CPS-packet comprising:
a CPS-packet header that comprises a channel identifier (CID) that identifies a user channel corresponding to a user device, and
a CPS-packet payload comprising said voice data, wherein said RAS server converts said voice data output from a first format to a second format in accordance with at least said CID,
wherein a RTP/UDP header and an IP header are added to said CPS-PDU to generate an IP packet for transport on a network, and
wherein said IP header and said UDP header are removed from said IP packet, and a virtual channel identifier (VCI) and a virtual path identifier (VPI), which are correlated to said IAD, and said CID are added to said data packet to convert said voice data from said IP packet to said CPS-PDU in accordance with said RTP header, which is subsequently removed from said data packet, and wherein said CPS-PDU is transmitted to said IAD.

22. A system for transporting voice data over internet protocol (IP), comprising:
an integrated access device (IAD), coupled to a plurality of user devices, each of said user devices configured to generate voice data, via an analog line and receiving said voice data from at least one of said user devices, said IAD generating a voice data output in a first format that comprises an ATM Adaptation Layer 2 (AAL2) cell having a plurality of protocol data units (PDUs), each of said PDUs comprising,
a cell header comprising a virtual channel identifier (VCI) and a virtual path identifier (VPI), and
a plurality of common part sublayer (CPS)-packets, each of said CPS-packets comprising,
a CPS-packet header that comprises a channel identifier (CID) that identifies a user channel corresponding to one of said user devices, and
a CPS-packet payload comprising said voice data, wherein said RAS server converts said voice data output from said first format to said second format in accordance with said VCI and said VPI and said CID, a registration, administration and status (RAS) server that is coupled to said IAD via an asymmetric digital subscriber line (ADSL) and configured to convert said voice data output between said first format and a second format in accordance with header information stored in a storage device of said RAS server, said second format comprising a RTP/UDP/IP header containing RTP header information, wherein said second format is converted to said first format in accordance with said RTP header information, wherein a first command signal and header information are transmitted from said IAD to said RAS server, said first command signal instructs said RAS server to store said header information in said storage device, a second command signal and header information is transmitted from said IAD to said RAS server in response to a termination decision, and said second command signal instructs said RAS server to remove said header information from said storage device, wherein said storage device comprises a read-only memory (ROM) or a random access memory (RAM);
a multiplexer coupled to said RAS server via an OC-3 or STM-1 line, wherein said multiplexer is also coupled to said IAD and multiplexes a virtual channel identifier (VCI) and a virtual path identifier (VPI) correlated to said IAD, into said header information; and
a network, coupled to said RAS server, that receives and transmits said voice data output in said second format, wherein said RAS server converts said voice data output received from said network, from said second format to said first format, and a first user and a second user are positioned at a common RAS server or different RAS servers, and said first user and said second user are positioned at said common RAS server and at a common IAD or different IADs, and two voice packets can be inserted on said AAL2 cell.

23. The system of claim 22, said CPS-packet header further comprising:
a length indicator that identifies the length of a payload of said CPS-packet;
a user-to-user indication that provides a link between said CPS-packet and a service-specific convergence sublayer (SSCS); and
a head error control, wherein said CPS-PDU further comprises a start field comprising an offset field, a sequence number and a parity bit in a start field positioned between each of said CPS-packets.

24. The system of claim 22, further comprising a voice over IP server positioned in said network for routing said voice data output in said second format from a first user to a second user.

25. A method of transmitting voice over Internet protocol (VOIP), comprising:
(e) processing a user-generated request signal in an integrated access device (IAD);
(f) generating and transmitting a first command signal to a registration, administration and status (RAS) server;
(g) transporting voice data on an AAL2 cell generated in said IAD, said AAL2 cell not including a RTP/UDP/IP header; and
upon a user termination request, generating and transmitting a second command signal to said RAS server,
further comprising:
said RAS server receiving an IP packet from a network and stripping an IP/UDP portion of said RTP/UDP/IP header from said IP packet to extract an RTP packet;

matching RTP information from said RTP packet with information stored in said RAS server in accordance with said first command signal to select a virtual path identifier (VPI) and a virtual channel identifier (VCI) corresponding to said IAD, and a channel identifier (CID) corresponding to a user interface;

generating said AAL2 cell using said VCI, VPI and CID to generate a CPS packet header; and stripping said RTP header from said RTP packet, and adding said voice data to said CPS packet header to generate said AAL2 cell.

26. The method of claim 25, further comprising said IAD receiving said AAL2 cell from said RAS server, and transporting said voice data to said user interface.

27. A method of transmitting voice over Internet protocol (VOIP), comprising:

(h) processing a user-generated request signal in an integrated access device (IAD);

(i) generating and transmitting a first command signal to a registration, administration and status (RAS) server;

(j) transporting voice data on an AAL2 cell generated in said IAD, said AAL2 cell not including a RTP/UDP/IP header; and upon a user termination request, generating and transmitting a second command signal to said RAS server, further comprising conversion by said RAS server of said AAL2 cell into an IP packet for internet transport, said conversion step comprising:

stripping AAL2 cell information from said AAL2 cell, and extracting a virtual path identifier (VPI) and a virtual channel identifier (VCI) corresponding to said IAD, and a channel identifier (CID) corresponding to a user interface;

selecting an RTP header in accordance with said extracted VPI, VCI and channel identifier information to generate a RTP/UDP/IP header; and inserting said RTP/UDP/IP header into said stripped AAL2 cell to generate said IP packet.

28. A method of transmitting voice over Internet protocol (VOIP), comprising:

(k) processing a user-generated request signal in an integrated access device (LAD);

(l) generating and transmitting a first command signal to a registration, administration and status (RAS) server;

(m) transporting voice data on an AAL2 cell generated in said IAD, said AAL2 cell not including a RTP/UDP/IP header; and upon a user termination request, generating and transmitting a second command signal to said RAS server, wherein said transporting step comprises transporting a plurality of said AAL2 cells, wherein each of said AAL2 cells comprises a plurality of protocol data units (PDUs), each of said PDUs including at least two voice payloads and comprising:

a cell header comprising a virtual channel identifier (VCI) and a virtual path identifier (VPI); and a plurality of common part sublayer (CPS)-packets, each of said CPS-packets comprising, a CPS-packet header that comprises a channel identifier (CID) that identifies a user channel corresponding to one of said user devices, and a CPS-packet payload comprising said voice data, wherein said RAS server converts said voice data output from said first format to said second format in accordance with said VCI and said VPI and said CID.

29. A method of transmitting voice over an Internet protocol (IP), comprising:

(a) receiving a first command signal and header data in a registration, administration and status (RAS) server;

(b) storing header information for transmitting to a network in a memory storage device, in accordance with said header data and said first command signal;

(c) said RAS server receiving a voice data in a first format from a device, and converting said voice data from said first format into said second format in said RAS server; and (d) transmitting said voice data in said second data format to said network wherein said converting step comprises:

receiving said voice data in said first format that comprises an AAL2 cell having no RTP/UDP/IP header, and having a CPS-packet header comprising a channel identifier (CID) that corresponds to a user interface, and a virtual channel identifier (VCI) and a virtual path identifier (VPI) that corresponds to a device identifier; and forming said second format as an IP header by (a) inserting said RTP/UDP header from said memory storage device in accordance with said VCI, VPI and CID, extracted from said first format, and (b) inserting an IP header.

30. The method of claim 29, wherein said IP header is received in said network, and said AAL2 cell is received from said device that comprises an integral access device (IAD).

31. The method of claim 29, wherein an integral access device (IAD) transmits said first command signal and said second command signal to said RAS server.

32. The method of claim 29, wherein said converting step comprises:

receiving said voice data in said first format that comprises an IP packet having an IP header and a RTP/UDP header; and forming said second format that comprises an AAL2 cell having a CPS packet, said AAL2 cell being formed by, stripping said IP header and said UDP header to extract an RTP packet, matching information from said RTP header of said RTP packet with information in said memory storage device to select a virtual channel identifier (VCI) and a virtual path identifier (VPI) and a channel identifier (CID), inserting said VCI and VPI into a header and inserting said CID into a CPS packet header, and adding said voice payload to said CPS packet.

33. The method of claim 29, wherein said network comprises the Internet.

34. A method of transmitting voice over an Internet protocol, comprising:

generating a plurality of voice data packets having a first format in a device, said first format including an IP header;

converting said voice data packets from said first format to a second format at a converter, and in accordance with data packet address information, said second format excluding said IP header;

multiplexing a plurality of said data packets in said second format and combining said plurality of data packets into a single transport cell; and transporting each cell containing said plurality of data packets having said second format to a network device for attachment of an IP header, wherein said data packets comprises voice data generated in accordance with a user-generated request.

35. A method of transmitting voice over an Internet protocol, comprising:
  generating a plurality of voice data packets having a first format in a device;
  converting said voice data packets from said first format to a second format at a converter, and in accordance with data packet address information; and
  transporting said plurality of data packets having said second format to a network, wherein said data packets comprises voice data generated in accordance with a user-generated request, further comprising:
  (a) generating and transmitting a first command signal to said converter;
  (b) processing a user-generated request signal in said first device, and removing a header of said request signal in accordance with a VOIP request signal type to generate said voice data packet;
  (c) transporting said voice data packet on an AAL2 cell generates in said first device, said AAL2 cell not including a RTP/UDP header or an IP header, wherein at least two voice data payloads are transported on said AAL2 cell; and
  (d) upon a user termination request, generating and transmitting a second command signal to said converter.

36. The method of claim 35, wherein said first command signal instructs said converter to store header data in a data storage device, said header data comprises RTP/UDP header information and IP header information, and said second command signal instructs said converter to remove said header data from said data storage device.

37. The method of claim 35, said step (a) further comprising generating and transmitting header data with said first command signal, and said step (d) further comprising transmitting said header data with said second command signal.

38. A method of transmitting voice over an Internet protocol, comprising:
  generating a plurality of voice data packets having a first format in a device;
  converting said voice data packets from said first format to a second format at a converter, and in accordance with data packet address information; and
  transporting said plurality of data packets having said second format to a network, wherein said data packets comprises voice data generated in accordance with a user-generated request, said converting and transporting steps comprising:
  in said converter, receiving an IP packet from said network, and stripping an IP header from said IP packet to generate an RTP packet;
  matching RTP information from said RTP packet with information stored in said converter in accordance with said first command signal to select a virtual path identifier (VPI) and a virtual channel identifier (VCI) corresponding to said device, and a channel identifier (CID) corresponding to a user interface;
  generating said AAL2 cell using said VCI, VPI and CID in a CPS packet header;
  stripping said RTP/UDP header from said RTP packet and adding said voice data to said CPS packet to generate said data packet having said second format as said AAL2 cell;
  transporting said AAL2 cell to said IAD comprising said device; and
  transporting said voice data to said user interface.

39. A method of transmitting voice over an Internet protocol, comprising:
  generating a plurality of voice data packets having a first format in a device;
  converting said voice data packets from said first format to a second format at a converter, and in accordance with data packet address information; and
  transporting said plurality of data packets having said second format to a network, wherein said data packets comprises voice data generated in accordance with a user-generated request, wherein said converter converts said voice data packet from an ATM cell into an IP packet for internet transport, said converting step comprising:
  stripping AAL2-type information from said AAL2 cell, and extracting a virtual path identifier (VPI) and a virtual channel identifier (VCI) corresponding to an integral access device (IAD) comprising said device, and a channel identifier (CID) corresponding to a user interface;
  selecting RTP header data in accordance with said extracted VPI, VCI and CID to generate said RTP/UDP/IP header; and
  inserting said RTP/UDP header and said IP header into said stripped AAL2 cell to generate said IP packet.

40. A method of transmitting voice over an Internet protocol, comprising:
  generating a plurality of voice data packets having a first format in a device;
  converting said voice data packets from said first format to a second format at a converter, and in accordance with data packet address information; and
  transporting said plurality of data packets having said second format to a network, wherein said data packets comprises voice data generated in accordance with a user-generated request, further comprising:
  (a) receiving a first command signal and header data in a registration, administration and status (RAS) server that comprises said converter;
  (b) storing RTP header information in a memory storage device in said RAS server, in accordance with said header data and said first command signal;
  (c) receiving said voice data from said device; and
  (d) removing said RTP header information from said memory storage device in said RAS server in accordance with a second control signal and header data to terminate said method.

41. The method of claim 40, said converting step comprising:
  receiving said voice data in said first format that comprises an AAL2 cell having no RTP/UDP header and no IP header, and having a CPS-packet header comprising a channel identifier (CID) that corresponds to a user interface, and a virtual channel identifier (VCI) and a virtual path identifier (VPI) that corresponds to an identifier for said device; and
  forming said second format that comprises IP header by (a) inserting said RTP/UDP header from said memory storage device in accordance with said VCI, VPI and CID, extracted from said first format, and (b) inserting an IP header.

42. The method of claim 40, said converting step comprising:
  receiving said voice data in said first format that comprises an IP packet having an IP header and a RTP/UDP header; and forming said second format that comprises an AAL2 cell having a CPS packet, said AAL2 cell being formed by, stripping said IP header to generate an RTP packet, matching information from said RTP/UDP header of said RTP packet with information in said memory storage device to select a virtual channel identifier (VCI) and a virtual path identifier (VPI) and a channel identifier (CID), inserting said VCI and VPI into a header and inserting said CID into a CPS packet header, and adding said voice payload to said CPS packet.

43. A method of transmitting voice data over Internet protocol (VOIP), comprising:
    (a) processing a user-generated request signal in an integrated access device (IAD);
    (b) generating and transmitting a first command signal that instructs said RAS server to store header data in a data storage device, and header data that comprises RTP/UDP/IP header information, to a registration, administration and status (RAS) server; and
    (c) transporting voice data on an AAL2 cell generated in said IAD, said AAL2 cell comprising:
        a cell header comprising a virtual channel identifier (VCI) and a virtual path identifier (VPI); and
        a plurality of common part sublayer (CPS)-packets, each of said CPS-packets comprising,
        a CPS-packet header that comprises a channel identifier (CID) that identifies a user channel corresponding to one of said user devices, and
        a CPS-packet payload comprising said voice data, wherein said RAS server converts said voice data output from said first format to said second format in accordance with said VCI and said VPI and said CID, said AAL2 cell not including a RTP/UDP/IP header, wherein a voice data payload is transported on said AAL2 cell.

44. The method of claim 43, further comprising:
    said RAS server receiving an IP packet from a network and stripping said IP header and said UDP header from said IP packet to extract an RTP packet;
    matching RTP information from said RTP packet with information stored in said RAS server in accordance with said first command signal to select a virtual path identifier (VPI) and a virtual channel identifier (VCI) corresponding to said IAD, and a channel identifier (CID) corresponding to a user interface that generates said user-generated request;
    generating said AAL2 cell by using said VCI, VPI and CID to generate a CPS packet header;
    stripping said RTP header from said RTP packet, and adding said voice data to said CPS packet header to generate said AAL2 cell; and
    said IAD receiving said AAL2 cell from said RAS server, and transporting said voice data to said user interface.

45. The method of claim 43, further comprising conversion by said RAS server of said AAL2 cell into an IP packet for internet transport, said conversion step comprising:
    stripping AAL2 cell information from said AAL2 cell, and extracting a virtual path identifier (VPI) and a virtual channel identifier (VCI) corresponding to said IAD, and a channel identifier (CID) corresponding to a user interface;
    selecting an RTP header in accordance with said extracted VPI, VCI and channel identifier information to generate a RTP/UDP/IP header; and
    inserting said RTP/UDP/IP header into said stripped AAL2 cell to generate said IP packet.

46. A method of transmitting voice over an Internet protocol (IP), comprising:
    (a) receiving a first command signal and header data comprising RTP/UDP/IP header information in a registration, administration and status (RAS) server;
    (b) storing RTP/UDP/IP header information in a memory storage device in said RAS server, in accordance with said header data and said first command signal;
    (c) said RAS server receiving a voice transmission in a first format from a first device, and converting said voice data from said first format into said second format in said RAS server;
    (d) transmitting said voice transmission in said second data format to a network; and
    (e) removing said RTP header information from said memory storage device in accordance with a second control signal to terminate said method, wherein an integral access device (IAD) transmits said first command signal and said second command signal to said RAS server, wherein said converting step comprises one of,
        (a) receiving said voice transmission in said first format that comprises an AAL2 cell having no RTP/UDP/IP header, and having a CPS-packet header comprising a channel identifier (CID) that corresponds to a user interface, and a virtual channel identifier (VCI) and a virtual path identifier (VPI) that corresponds to a first device identifier; and forming said second format as an IP header by inserting said RTP/UDP/IP header from said memory storage device in accordance with said VCI, VPI and CID, extracted from said first format, wherein said first device comprises an integral access device (IAD); and
        (b) receiving said voice transmission in said second format that comprises an IP packet having a RTP/UDP header, and forming said first format that comprises an AAL2 cell having a CPS packet, said AAL2 cell being formed by,
        stripping said IP/UDP header to extract an RTP packet,
        matching information from said RTP/UDP/IP header with information in said memory storage device to select a virtual channel identifier (VCI) and a virtual path identifier (VPI) and a channel identifier (CID),
        inserting said VCI and VPI into a header and inserting said CID into a CPS packet header, and
        adding said voice payload to said CPS packet, wherein said first device comprises said network and a second device comprises an integral access device (IAD).

47. A method of operating an integrated access device (IAD), comprising the steps of:
    receiving voice data from a transmitting device indicative of a Tx/Rx channel decision and including an IP address;
    deleting said IP address and forming a transport cell with multiplexed portions of said voice data;
    generating a first command signal in accordance with a said Tx/Rx decision to instruct a registration, administration and status (RAS) server to store in a storage device header data and an identifier for said IAD and said transmitting device;
    transmitting said voice data to said RAS server within said transport cell in accordance with said first command signal; and
    transmitting a second command signal from said IAD to said RAS server in response to a transmission termination decision, where said second command signal instructs said RAS server to remove the header information from said storage device and append it to said voice data.

48. A registration, administration and status (RAS) server, adapted to be coupled to an integrated access device (IAD) via an asymmetric digital subscriber line (ADSL) and configured to convert a voice data output between a first format and a second format in accordance with header information comprising:

a memory storage device that stores header data in accordance with a first command signal, and removes said header data in accordance with a second command signal; and a processor that converts voice data between said a first format and said a second format in accordance with said header data, wherein said second format comprises an RTP/UDP/IP header for transporting said voice data over IP, and said first format comprises an AAL2 cell having a plurality of protocol data units for transporting said voice data between said RAS server and a user, wherein said first format is converted to said second format in accordance with said RTP header information, and wherein a first command signal and header information are received from said IAD, said first command signal being operative to instruct the storage of said header information in said memory storage device, and said second command signal and header information are received from said IAD in response to a termination decision, said second command signal being operative to instruct the removal of said header information from said storage device.

* * * * *